United States Patent [19]

Cohen

[11] 4,010,304

[45] Mar. 1, 1977

[54] HEATED WINDOWS HAVING VACUUM-DEPOSITED LAYERS

[75] Inventor: Sabatino Cohen, Sceaux, France

[73] Assignee: Saint-Gobain Industries, Neuilly-sur-Seine, France

[22] Filed: July 24, 1975

[21] Appl. No.: 598,740

[30] Foreign Application Priority Data

July 26, 1974 France .............................. 74.26023

[52] U.S. Cl. ................................ 428/213; 428/432; 428/469; 428/472; 219/203

[51] Int. Cl.² ..................... B32B 7/02; B32B 15/04

[58] Field of Search ............ 428/34, 432, 469, 472, 428/213, 457; 156/99, 109, 107; 52/171; 296/84; 219/203

[56] References Cited

UNITED STATES PATENTS

| | | | |
|---|---|---|---|
| 2,676,117 | 4/1954 | Colbert et al. ............... | 428/432 |
| 3,180,781 | 4/1965 | Ryan et al. .................. | 156/99 |
| 3,523,847 | 8/1970 | Edwards ..................... | 156/99 |
| 3,720,541 | 3/1973 | King ......................... | 428/472 |
| 3,849,244 | 11/1974 | Groth ........................ | 428/232 |

*Primary Examiner*—George F. Lesmes
*Assistant Examiner*—P. J. Thibodeau
*Attorney, Agent, or Firm*—Pennie & Edmonds

[57] ABSTRACT

A glass sheet is provided with a metallic layer and auxiliary dielectric layers, at least one of the auxiliary layers being formed of a deposit of a heavy metal tungsten or molybdenum trioxide. The metallic trioxide may form an anchoring layer, and is advantageously of an interference thickness. Particular procedures for forming electric terminals for supplying heating current to the metallic layer are described. Laminated glazings with an intercalary plastic layer over the metallic trioxide layer are described.

12 Claims, 4 Drawing Figures

HEATED WINDOWS HAVING VACUUM-DEPOSITED LAYERS

Glazings are well known in which, by deposition under vacuum or by catalytic dissociation of salts, layers of metallic coatings or of metal oxides are formed. Used especially are silver and gold.

The proposed uses for such glazing may require coloring and semi-reflecting properties as well as electrical conductivity of such layers. The latter include heating by Joule effect upon the passage of electric current through the layer, which permits dehumidifying, defrosting or simply eliminating the cold-wall effect of the glass, etc.

To increase adhesion of the metallic layer, it is generally advantageous to deposit it on an anchoring layer generally consisting of an insulating or semi-conducting oxide. Similarly, to protect it and to improve its optical qualities, coating it with another dielectric layer, preferably anti-reflecting or, in other words, of interference thickness, for the purpose of improving the transmission of light and correcting the shade of the glass, if required, is known. It is to be noted, of course, that this layer does not in such case have sufficient thickness or resistance to be electrically protecting.

Among the dielectric materials proposed for building the auxiliary layers are especially silicon monoxide, which has the drawback of being delicate in industrial use since it does not readily permit obtaining coatings of homogeneous and reproducible quality. Also commonly used is zinc sulfide, the optical index of which is less advantageous but the deposit of which is easier, thus making it possible to obtain good anchorage. The coating layer is nevertheless quite vulnerable and if, for example, it is desired to use such glass on vehicles, it is necessary to give them the form of laminated glass assembled with the aid of an intercalary plastic sheet of polyvinyl butyral, the conducting layer being inside the glass in contact with the plastic, which has the drawback of making it fragile.

Further, as concerns the manufacture of windshields, it is necessary to retain high light transmission, so as not to interfere in particular with night driving, although the coating produces a certain reduction in transmission of heat from the sun. It is therefore essentially its conducting properties which may be utilized for the purpose of improving bad weather visibility. However, it is very difficult to produce coatings endowed with the desired qualities because they must have a sufficiently low surface electrical resistivity not to require high feed voltages; thus, for example, for safety reasons, the latter are limited to 48 V.

Now, these two requirements are contradictory: the attenuation of light decreases in effect when the thickness of the metallic layer diminishes, but the electrical resistivity on the contrary increases.

In practice, a compromise accepted as satisfactory for motor vehicles is that light transmission not be appreciably below 70% and the surface electrical resistivity be no greater than 15 ohms per square.

Thus it will be realized that it is particularly desirable in the case of heated windshields to obtain an improvement in light transmission by diminution of the quantity of light reflected and an improvement in electrical conductivity by improvement of the structure of the deposit.

Pursuant to the invention, it has been found that the use of layers of a heavy metal tungsten or molybdenum trioxide as auxiliary layers associated with conducting metallic layers is capable of leading to particularly advantageous compromises.

According to one feature of the invention, such a metallic trioxide layer used as an anchorage layer has an interference thickness, that is, it is adjusted in such manner that it will give a maximal transmission in the finished glazing. In practice, there will advantageously be selected a layer thickness reducing transmission through the glass plate to values of between 77 and 87% of the initial transmission in the middle of the visible spectrum, for example for a wavelength of 550 nm. Also the thickness of a superficial protective metallic trioxide layer is similarly adjusted. In particular, when this layer is to be placed in contact with an intercalary plastic sheet of polyvinyl butyral, its thickness is determined so as to exceed slightly the thickness that will achieve the improvement of maximal light transmission in air, before placement of the intercalary plastic sheet. Preferably, deposition is continued until the improvement in the transmission of light at the lower limit of the wavelengths of the visible spectrum, i.e. for example, for a wavelength of 440 nm, attains and then goes beyond the maximum and decreases again by an amount reaching preferably 10% without exceeding 16% of the maximal improvement observed.

On glass using a coating having the metallic layer made of a deposit of silver, the optical qualities procured by a metallic trioxide layer are slightly inferior to those of an equivalent layer of zinc sulfide and the coating is subject to a certain aging. On the other hand, the use of such metallic trioxide makes it possible to use the conductivity of the deposit to create for example a heating glazing, which constitutes a decisive advantage. In point of fact, in the known solutions and especially in laminated glass, there is observed, upon application of voltage, a deterioration of the conducting layer in the vicinity of the current lead-in contacts. This phenomenon disappears if the dielectric layer interposed between said conducting layer and the power collector is made of molybdenum trioxide.

Use is then indicated of a single auxiliary trioxide layer, placed on the side of the electric contact and associated for example with a complementary layer of zinc sulfide.

Advantageously, the collectors or electrical contact areas may be made of a layer of a metallic frit deposited by silk screen on the plate of glass and baked during its heat treatments by hitherto known processes. The layer of molybdenum or of tungsten trioxide will then be the anchoring layer, which has the advantage of improving the conductibility of the metallic layer.

When the metallic layer is constituted essentially of a deposit of gold, the use of zinc sulfide does not present, at the level of the contacts, the aforementioned drawback. But the metallic trioxide, in a suitable thickness, this time has the advantage not only as anchoring layer of improving the conductibility, but also of obtaining better transmission of light. It is hence preferable to use two layers of molybdenum or tungsten trioxide, one as an anchoring layer and the other as a protective layer, both of an interference thickness.

The following examples, given by way of non-limiting illustration, describe the process of manufacture of glazing pursuant to the invention.

Figure 1:
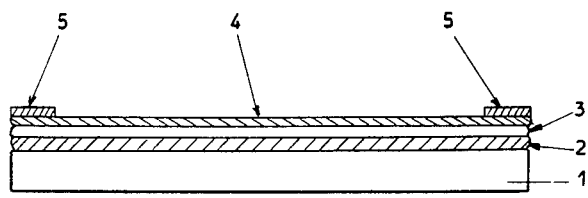
FIG. 1 represents a cross-section of a plate of glass provided pursuant to the invention with a conducting coating and with contact bands of conducting lacquer.
Figure 3:
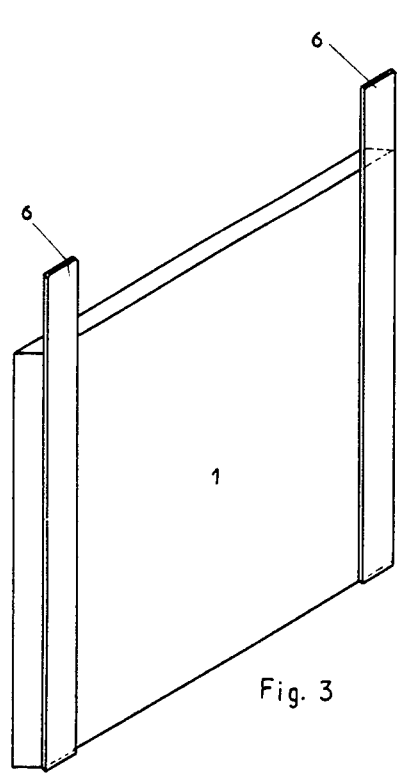
FIG. 3 represents heating glazing according to FIGS. 1 or 2 with current lead-in plates of copper.

According to FIG. 1, the glass support 1 is coated first of all with a dielectric anchoring layer 2 on which has next been deposited a metallic layer 3, coated in turn by a dielectric protective layer 4. Bands 5 of silver lacquer are placed laterally along the two opposing edges of the glass. Placement is next made of the copper plates 6 (FIG. 3) which are applied directly on the bands 5.

Figure 2:
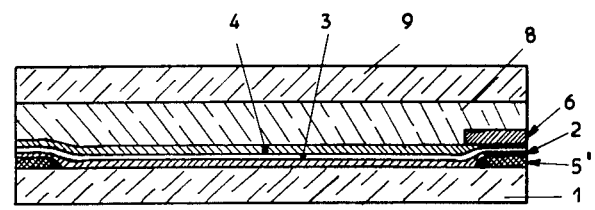
FIG. 2 represents in section a variant in which the power collector is executed with the aid of a baked metallic frit.

According to FIG. 2, the power collector 5' is formed of a silver frit deposited in the first instance, which facilitates subsequent manufacturing operations by reducing handling. The glass sheet 1 is then completely coated by the successive layers 2, 3 and 4. This is followed by the placement of copper plates 6 and then of the intercalary sheet of polyvinyl butyral 8 and finally glass sheet 9. The pressure exerted during manufacture of the laminated glazing suffices to establish a contact between the copper plates 6 and the power collector 5'.

Figure 4:
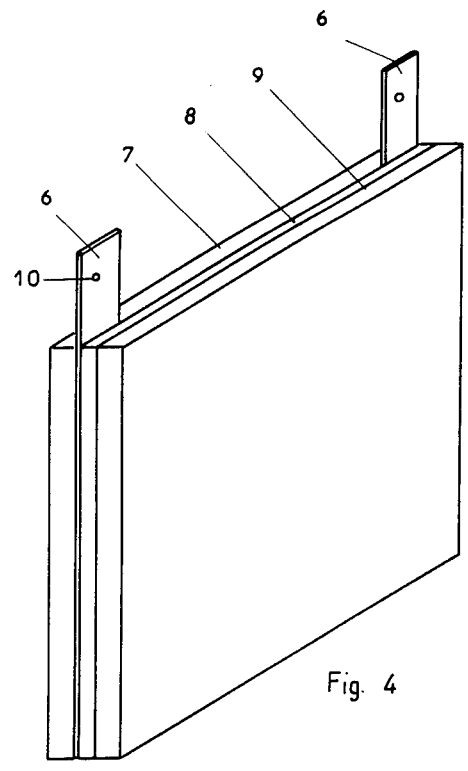
FIG. 4 represents, in perspective, a complete piece of laminated heating glazing.

The complete piece of glazing represented in FIG. 4 includes, placed on the glass sheet and its coating pursuant to the arrangement of FIG. 1 and designated overall by the reference 7, an intercalary sheet of polyvinyl butyral 8 and a second glass sheet 9. The copper plates 6 carry terminals 10.

EXAMPLE 1

On a sheet of glass 3 mm thick, there is deposited by evaporation under vacuum, according to a per se known process, a layer of ZnS the thickness whereof is such that the control photometer, calibrated to 100% on the glass specimen, after deposit gives a transmission of 75% for a wavelength of 550 nm. Following this operation, deposition is made of a silver layer to result in a photometer reading of 64%.

Molybdenum trioxide in pulverulent form is then evaporated in a molybdenum crucible parallelepiped in shape and equipped with a perforated cover. On the photometer is noted a rise in the light transmission of the specimen, and the operation of evaporation of the molybdenum trioxide is halted at the point where transmission passes a maximal value, which is on the order of 96%.

The specimen thus obtained is then provided with contacts in the form of conducting lacquer bands of silver applied by brush on two opposing edges of the volume of glass. The lacquer may be that supplied by the Demetron Co. at Hanau in the Federal Republic of Germany and sold under the name "Silver lacquer 200." The contact bands are given a width on the order of 5 mm.

The specimen is then dried at 120° C, according to the directions for use of the lacquer. Before continuing with assembly of the specimen with another volume of glass to make a laminated piece of heating glazing, there is applied on each of the contact bands a copper plate serving as a current lead-in.

The specimen thus prepared is then assembled by the medium of a sheet of P.V.B. 0.76 mm thick with another sheet of glass (or of plastic). The sandwich thus comprised is provided with clamps on its periphery, then placed in an autoclave, subjected to the action of vacuum and of heat, then of pressure, in per se known manner. These operations produce adhesion of the volumes of glass by the P.V.B. and lead to the obtaining of laminated glazing that need only be supplied with electric power through the intermediary of the copper plates to produce heating thereof.

The following table gives the characteristics of the glazing obtained after the assembly operations described above:

| electrical resistivity ($\Omega/\square$) | light transmission y in % | coefficient of reflection in % |
| --- | --- | --- |
| 6.3 | 77 | 14 |

EXAMPLE 2

This example describes the manufacture of a piece of glazing comprising a glass substrate, a dielectric layer of molybdenum trioxide, a layer of gold, and again a layer of molybdenum trioxide.

On a glass sheet 3 mm thick, there is deposited, by evaporation under vacuum according to a per se known process, a layer of molybdenum trioxide having a thickness such that the control photometer, calibrated to 100% on the glass specimen, after deposition gives 84% for a wavelength of 550 nm. This operation is followed by the deposition of a layer of gold which lowers the reading on the photometer to 66%, after which there is again deposited a layer of molybdenum trioxide so as to obtain maximum transmission on the photometer. A laminated piece of glazing is then made according to the method described in Example 1.

The table below summarizes the characteristics of this laminated glazing:

| electrical resistivity ($\Omega/\square$) | light transmission y in % | coefficient of reflection in % |
| --- | --- | --- |
| 11 | 74 | 11 |

EXAMPLE 3

This example describes the manufacture of a piece of glazing comprising a glass substrate, a dielectric layer of zinc sulfide, a layer of gold and a layer of molybdenum trioxide.

On a glass sheet 3 mm thick, there are deposited by serigraphy two conducting bands from a silver paste which are baked. The operation of deposition under vacuum is then conducted according to a per se known process. The first layer of ZnS deposited has a thickness such that the control photometer, previously calibrated to 100% on the glass specimen, after deposition and for a wavelength of 550 nm, gives a transmission of 83%. A layer of gold is then deposited until transmission is reduced to 70%. Then photometric control is carried out at 440 nm so as to improve precision and molybdenum trioxide is deposited until transmission passes a maximum and begins to decrease, a halt taking place when the reduction attains approximately 10% of the amplitude of the variation in transmission produced by the deposition of molybdenum trioxide.

A laminated piece of glazing is then made according to the method Example with, however, a simplification due to eliminated of the operation of painting with the conducting lacquer.

The characteristics of the glazing obtained are:

| Resistivity Ω/□ | Light transmission y in % | Coefficient of Reflection in % |
|---|---|---|
| 11 | 75 | 10 |

EXAMPLE 4

This example describes the manufacture of a piece of glazing comprising a glass substrate, a layer of ZnS deposited at a thickness such that the control photometer, previously calibrated to 100% on the glass specimen, gives, after deposit and for a wavelength of 550 nm, a transmission of 83.5%. A layer of gold is then deposited until the transmission is reduced to 70%. Photometric control is then carried out at 440 nm for deposit of a tungsten trioxide layer. Transmission passes a maximum, then decreases. A halt is made at a 10% decrease of the amplitude of the variation in transmission produced by the deposition of tungsten trioxide.

The characteristics of the glazing obtained are:

| Resistivity Ω/□ | Light transmission y in % | Coefficient of Reflection in % |
|---|---|---|
| 14 | 76 | 10 |

In general, materials constituting transparent substrates suitable to the invention may be certain vitroceramic materials or even plastic materials such as, for example, transparent polycarbonates, polyamides, polyesters or polyvinyl chlorides.

I claim:

1. A glazing comprising a glass sheet coated with an auxiliary dielectric anchoring layer, a metallic layer in contact with the anchoring layer, and a second auxiliary dielectric layer in contact with the metallic layer, in which at least one of the dielectric layers is formed of a deposit of a trioxide of tungsten or molybdenum.

2. A glazing according to claim 1 in which the auxiliary anchoring layer is formed of a deposit of a trioxide of tungsten or molybdenum, trioxide and is of an interference thickness.

3. A glazing according to claim 2 in which the anchoring layer has a thickness that reduces the transmission through the glazing in the middle of the visible spectrum to values in the range of 77% to 87% of the initial transmission.

4. A glazing according to claim 1 in which said second auxiliary layer is formed of a trioxide of tungsten or molybdenum, said glazing including an intercalary plastic layer over said second auxiliary layer, the thickness of said second auxiliary layer being slightly greater than a thickness producing a maximal improvement in the transmission of light before placing said intercalary plastic layer thereover.

5. A glazing according to claim 4 in which the improvement in light transmission produced by said second auxiliary layer near the lower limit of the visible spectrum is less than said maximal improvement by an amount not exceeding 16%.

6. A glazing according to claim 1 including electrical contact areas for supplying heating power to said metallic layer, at least one of said auxiliary dielectric layers being interposed between said electrical contact areas and said metallic layer and being formed of a trioxide of tungsten or molybdenum.

7. A glazing according to claim 6 in which said metallic layer has a thickness reducing light transmission therethrough by approximately 12% to 20%.

8. A glazing according to claim 6 in which said electrical contact areas comprise a layer of a baked metallic frit on said glass sheet, and said auxiliary dielectric anchoring layer is a trioxide of tungsten or molybdenum, and is of interference thickness.

9. A glazing according to claim 6 in which said metallic layer is of silver.

10. A glazing according to claim 6 in which said metallic layer is essentially constituted of a deposit of gold.

11. A glazing according to claim 10 in which both of said auxiliary dielectric layers on opposite sides of the gold layer are of a trioxide of tungsten or molybdenum, and are of interference thickness.

12. A glazing according to claim 1 including an intercalary plastic layer over said second auxiliary layer, and having a light transmission greater than 75% and an electrical surface resistivity less than 15 ohms per square.

* * * * *